US006777643B2

(12) United States Patent
Bowker et al.

(10) Patent No.: US 6,777,643 B2
(45) Date of Patent: Aug. 17, 2004

(54) APPARATUS AND METHOD FOR LASER ETCHING WEAR PATTERNS INTO DENIM PANTS

(75) Inventors: Roland D. Bowker, Oak Lawn, IL (US); Robert H. Fesmire, Barrington Hills, IL (US); Grzegorz Osinski, Cincinnati, OH (US); David Loranca, Buffalo Grove, IL (US); Jorge Michel, Hoffman Estates, IL (US)

(73) Assignee: Ellis Corporation, Itasca, IL (US)

( * ) Notice: Subject to any disclaimer, the term of this patent is extended or adjusted under 35 U.S.C. 154(b) by 0 days.

(21) Appl. No.: 10/361,474

(22) Filed: Feb. 10, 2003

(65) Prior Publication Data

US 2003/0146194 A1 Aug. 7, 2003

Related U.S. Application Data

(63) Continuation-in-part of application No. 09/896,568, filed on Jun. 29, 2001, now Pat. No. 6,559,410.

(51) Int. Cl.[7] .............................................. B23K 26/36
(52) U.S. Cl. .............................. 219/121.68; 219/121.69
(58) Field of Search ........................ 219/121.6, 121.67, 219/121.68, 121.69, 121.72, 121.82, 121.85

(56) References Cited

U.S. PATENT DOCUMENTS

| 3,784,183 | A | | 1/1974 | Castro et al. |
| 4,205,216 | A | * | 5/1980 | Douglas .................. 219/121.6 |
| 6,278,079 | B1 | * | 8/2001 | McIntyre et al. ...... 219/121.67 |
| 6,559,410 | B2 | * | 5/2003 | Bowker et al. ........ 219/121.68 |

FOREIGN PATENT DOCUMENTS

JP          03281079 A     12/1991

* cited by examiner

Primary Examiner—Samuel M. Heinrich
(74) Attorney, Agent, or Firm—Leydig, Voit & Mayer, Ltd.

(57) ABSTRACT

An apparatus and method for forming simulated wear patterns and designs in denim pants using laser rays. The apparatus includes an indexable carousel having a plurality of circumferentially spaced pant-supporting mandrels that are sequentially indexable to a plurality of stations located about the carousel, including a loading station, a laser station, and an unloading station. The mandrels each comprise articulated linkage that is selectively actuatable between a retractable condition that permits positioning of a pair of pants onto the mandrel at the loading station and an expanded condition that tautly supports the pants in predetermined position at the laser station such that a laser generated pattern can be formed at predetermined locations on the pants.

46 Claims, 13 Drawing Sheets

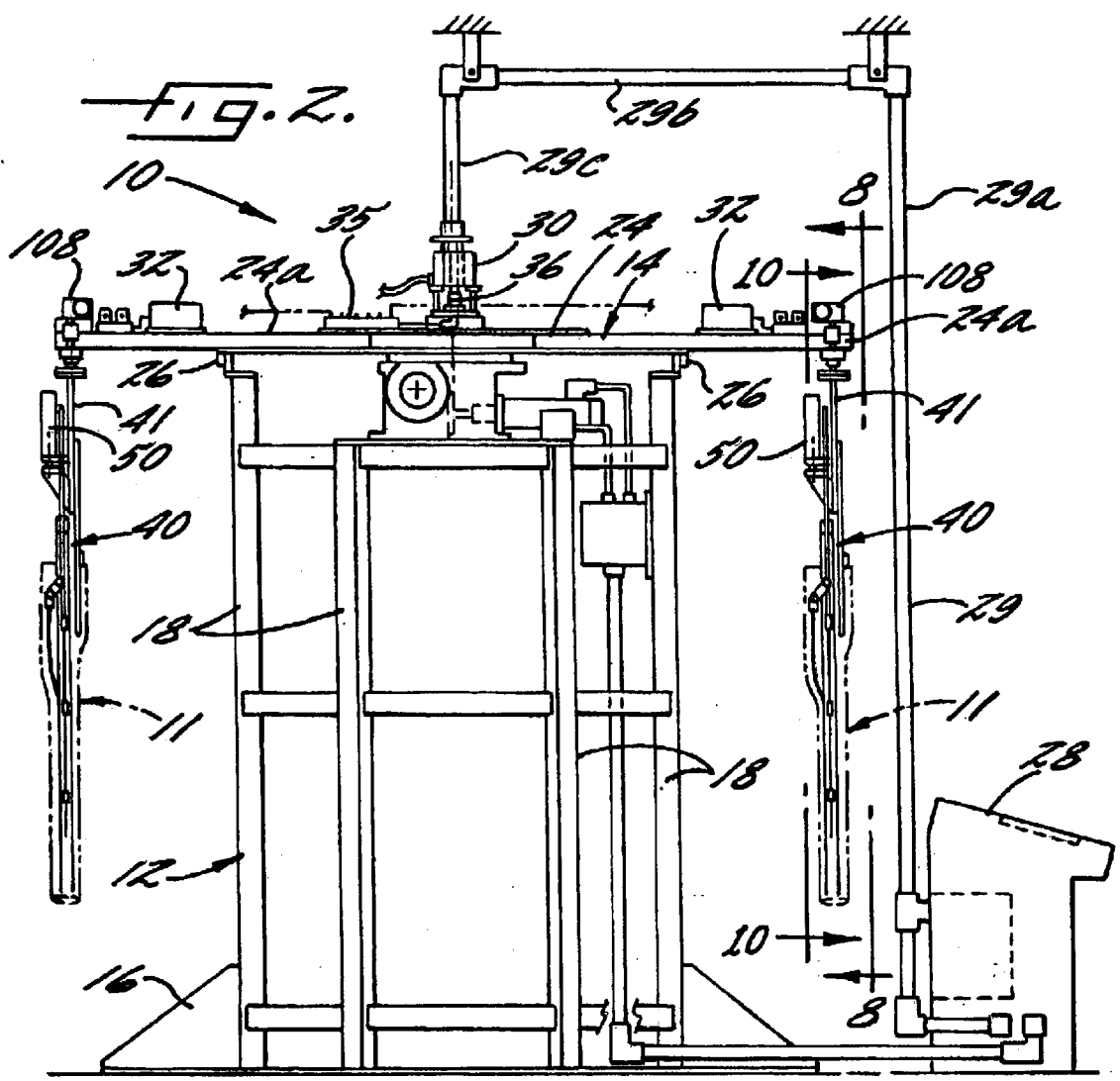

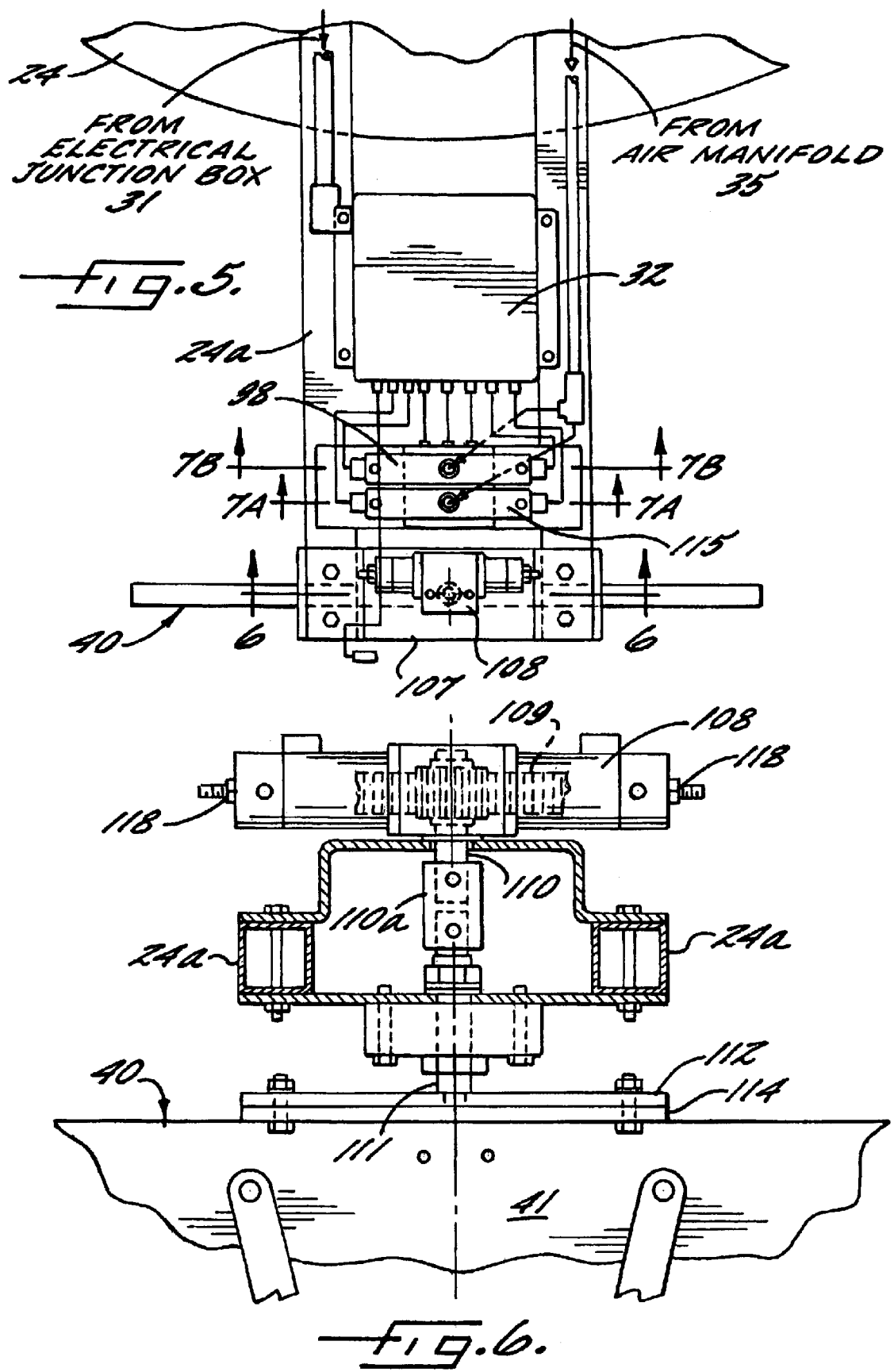

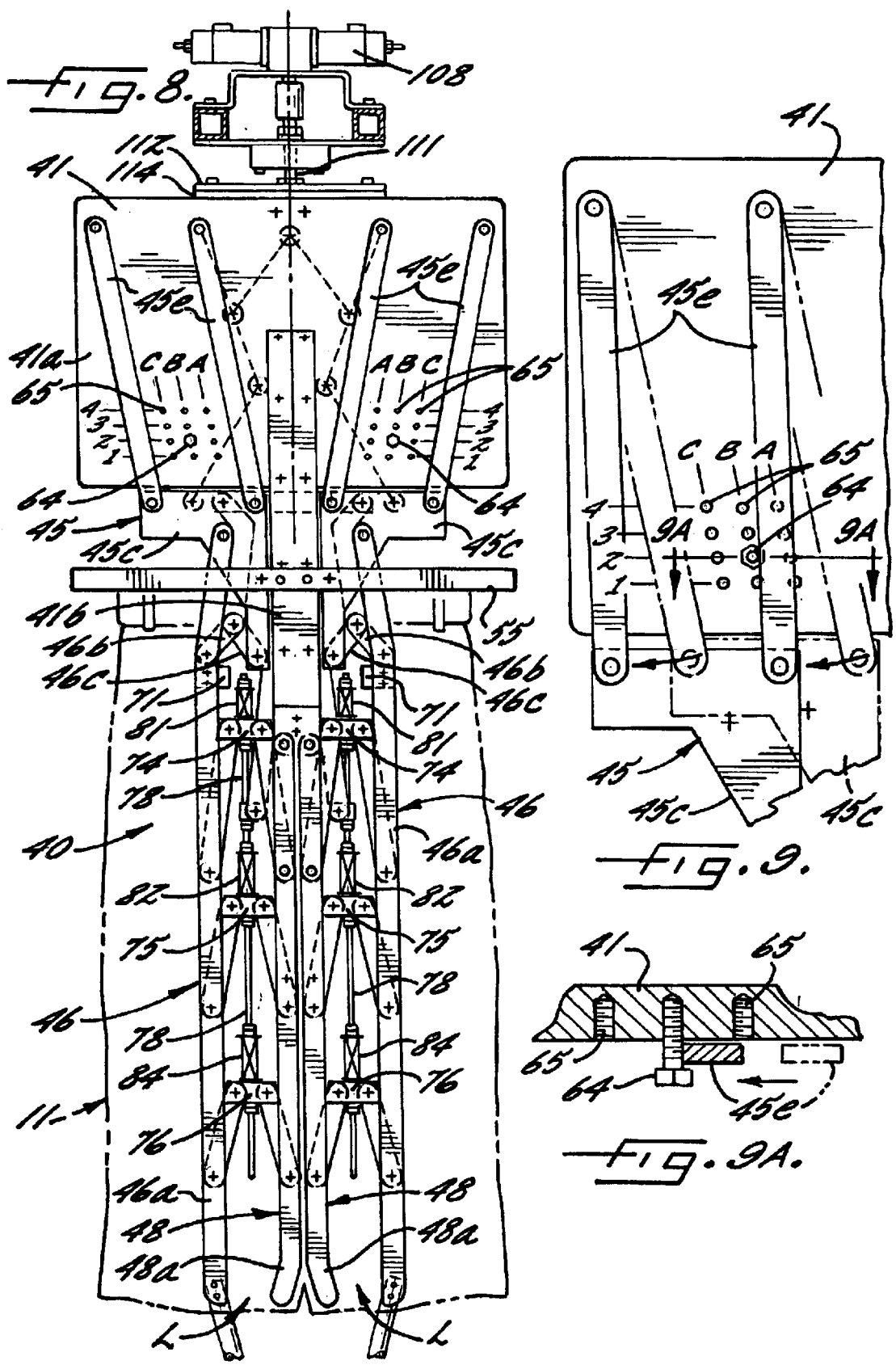

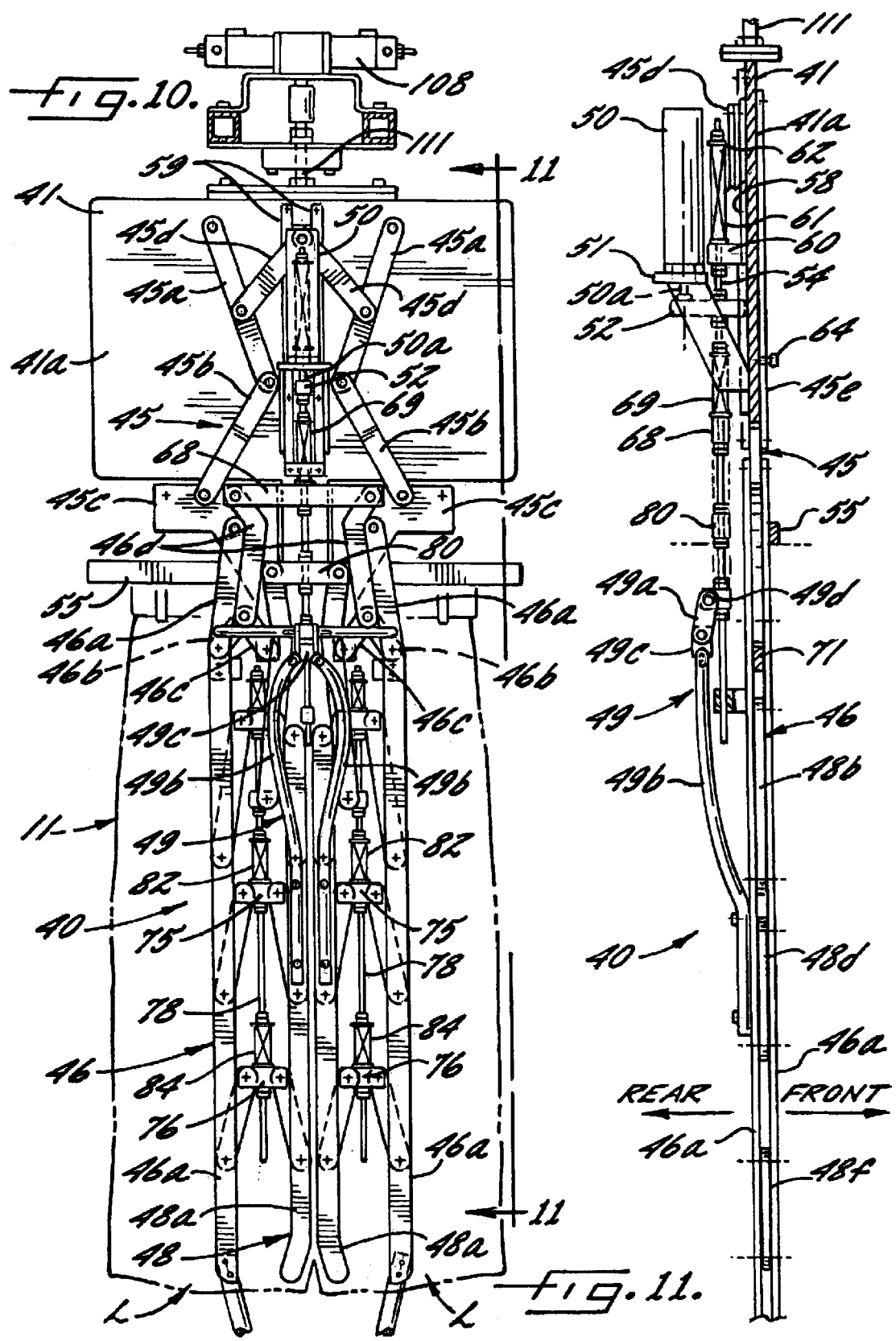

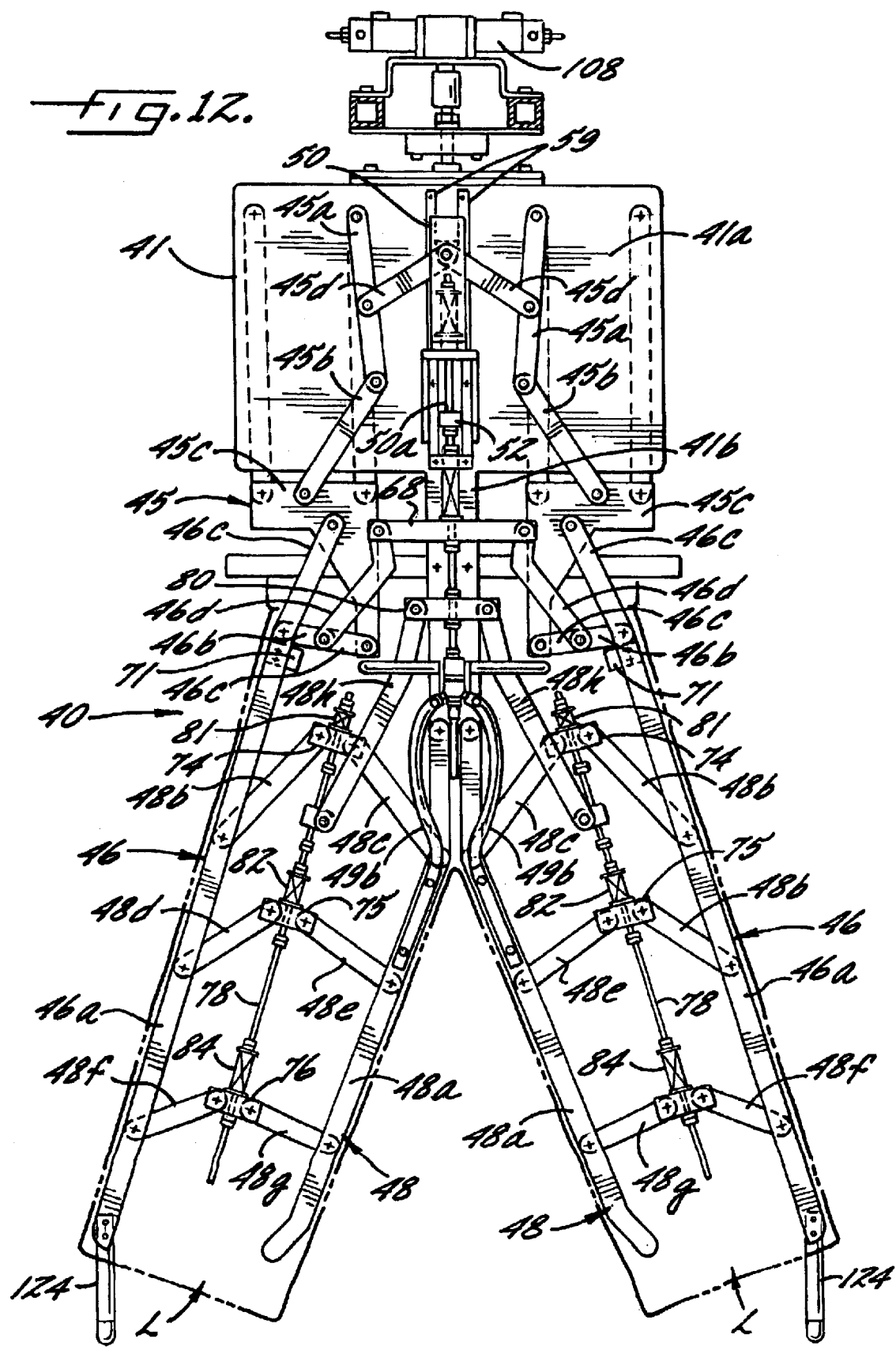

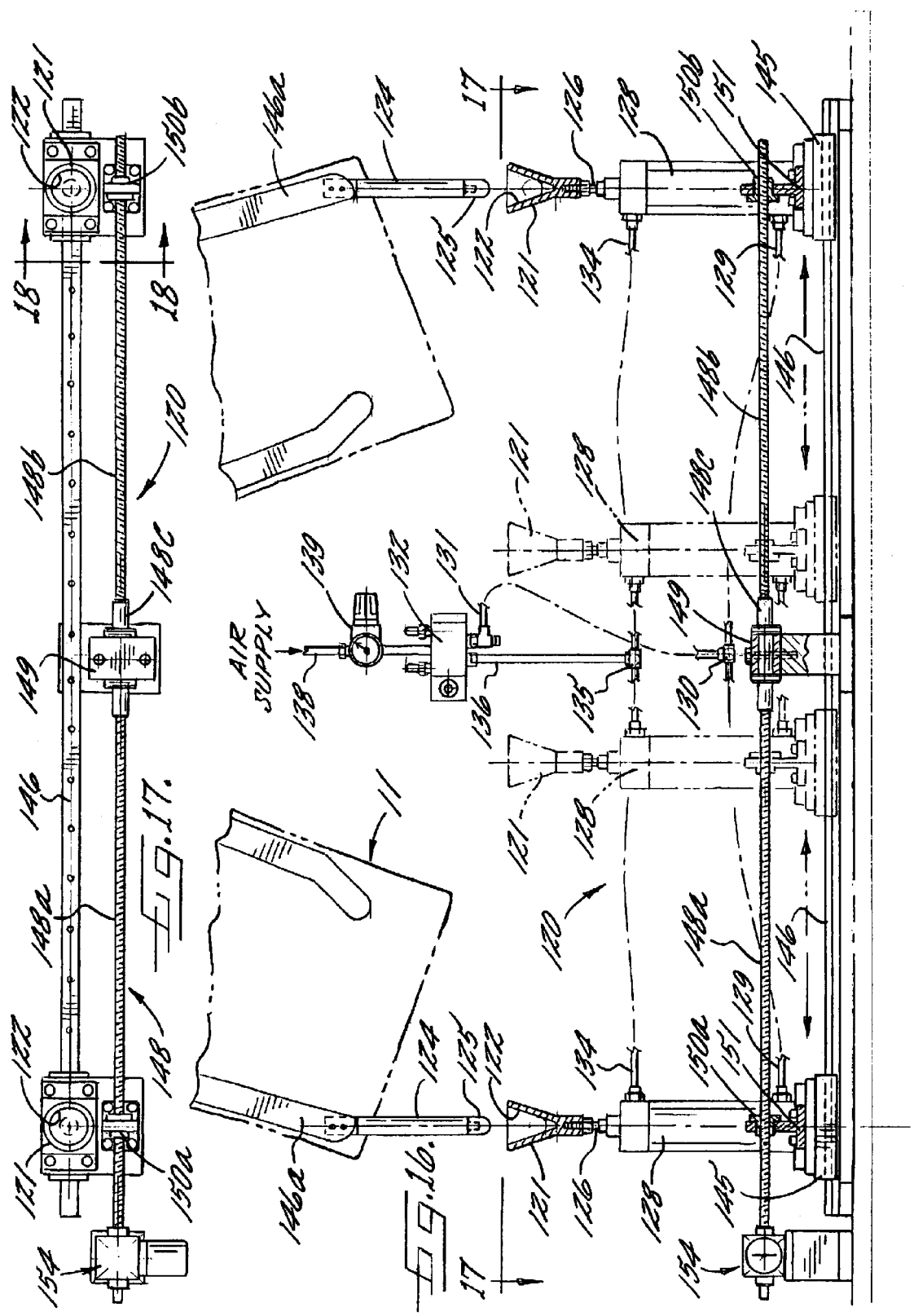

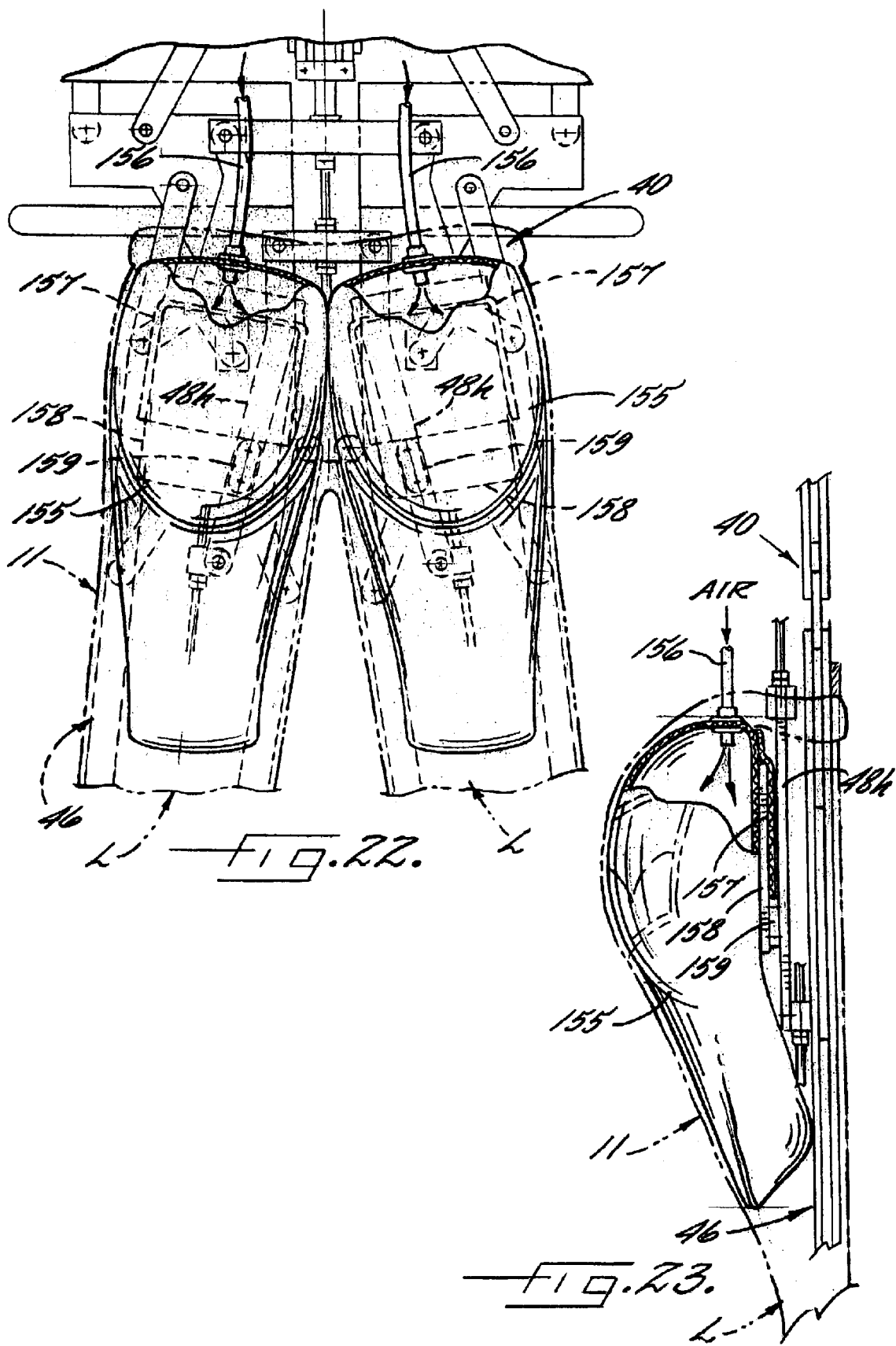

APPARATUS AND METHOD FOR LASER ETCHING WEAR PATTERNS INTO DENIM PANTS

RELATED APPLICATION

The present application is a continuation-in-part of application Ser. No. 09/896,568 filed Jun. 29, 2001 now U.S. Pat. No. 6,559,410.

FIELD OF THE INVENTION

The present invention relates generally to an apparatus and method of manufacturing denim or blue jean clothing, and more particularly, to an apparatus and method for producing blue jean pants with a worn appearance using laser technology.

BACKGROUND OF THE INVENTION

There has long been a demand for blue jean or denim pants that have a worn appearance. It is known to use stone washing techniques to produce pants with a faded coloring. Not only is stone washing a relatively time consuming process, it creates a substantially uniformly lightened or faded appearance which is not typical of blue jeans after prolonged wear.

While it has been proposed to use lasers to etch or burn worn and faded areas on jean pants that more closely approximate actual wear, such technique does not lend itself to efficient or economical commercial manufacture. Unlike stone washing in which the entire garment is simultaneously processed, the laser beam must be directed to specific front and backside areas of the pant which can necessitate cumbersome handling of the garment. Slight wrinkling or folds in the denim material also will impede the laser treatment, resulting in unsightly and unnatural streaking in the laser treated areas. This problem is compounded by irregular contours in the legs and excess material in the buttock area of the pants which can make it difficult to hold the pants in a flat or taut condition during the laser treatment. Without extreme care and special handling, it also is difficult to uniformly impart preprogrammed laser treatment to the pants in a continuous manufacturing operation. The numerous different styles and sizes of jeans that must be manufactured also make it difficult to uniformly apply preprogrammed laser imparted wear pattern areas to the pants.

OBJECTS AND SUMMARY OF THE INVENTION

It is an object of the present invention to provide an apparatus and method for efficiently handling and reliably etching wear or other pattern areas into denim pants using lasers.

Another object is to provide an apparatus and method as characterized above which presents denim pants to a laser station in taut predetermined relation to the laser device for repeatable accurate laser etching.

A further object is to provide a method and apparatus of the foregoing type which accommodates different styles and sizes of denim pants.

Yet another object is to provide an apparatus and method of the above kind that are adapted to uniformly impart preprogrammed laser treatment to pants in a continuous manufacturing process.

Still a further object is to provide such an apparatus and method of the above kind which precisely present and orient denim pants in a plurality of positions at the laser station to enable automatic laser treatment to a multiplicity of areas on both the front and rear sides of the garment.

Another object is to provide an apparatus of the foregoing type that can be safely operated on a continuous basis by a single operator.

Other objects and advantages of the invention will become apparent upon reading the following detailed description and upon reference to the drawings, in which:

BRIEF DESCRIPTION OF THE DRAWINGS

FIG. 2 is an elevational view of the machine shown in FIG. 1 taken in the plane of line 2—2;

FIGS. 3A and 3B are front and rear views, respectively, of a pair of pants that have been processed through the illustrated machine;

FIG. 5 is an enlarged top plan view of one of the carousel mounted mandrels of the illustrated machine;

FIG. 6 is an enlarged vertical section of the mandrel mounting, taken in the plane of line 6—6 in FIG. 5;

FIG. 8 is an enlarged front elevational view of one of the mandrels of the illustrated machine, taken in the plane of line 8—8 in FIG. 2, showing the mandrel in a retracted pant receiving and removal condition;

FIG. 9 is an enlarged side elevational view of the adjustment mechanism for the waist control linkage of the mandrel shown in FIG. 8;

FIG. 9A is an enlarged fragmentary section taken in the plane of line 9A—9A in FIG. 9;

FIG. 10 is an enlarged rear elevational view of the mandrels shown in FIG. 8, taken in the plane of line 10—10 in FIG. 2;

FIG. 11 is a side elevational view of the illustrated mandrel, taken in the plane of line 11—11 in FIG. 10;

FIG. 12 is a rear elevational view of the mandrel shown in FIG. 10 in an expanded pant holding position;

FIG. 16 is an enlarged vertical section of a mandrel alignment device at the laser station, taken in the plane of line 16—16 in FIG. 15, showing the alignment device in a lowered ready position;

FIG. 17 is a top view of the mandrel alignment device, taken in the plane of line 17—17 in FIG. 16;

FIG. 22 is a front elevational view of the mandrel shown in FIG. 20, with the bladders in an expanded pant supporting position; and FIG. 23 is a side elevational view of the mandrel shown in FIG. 22.

Figure 1:
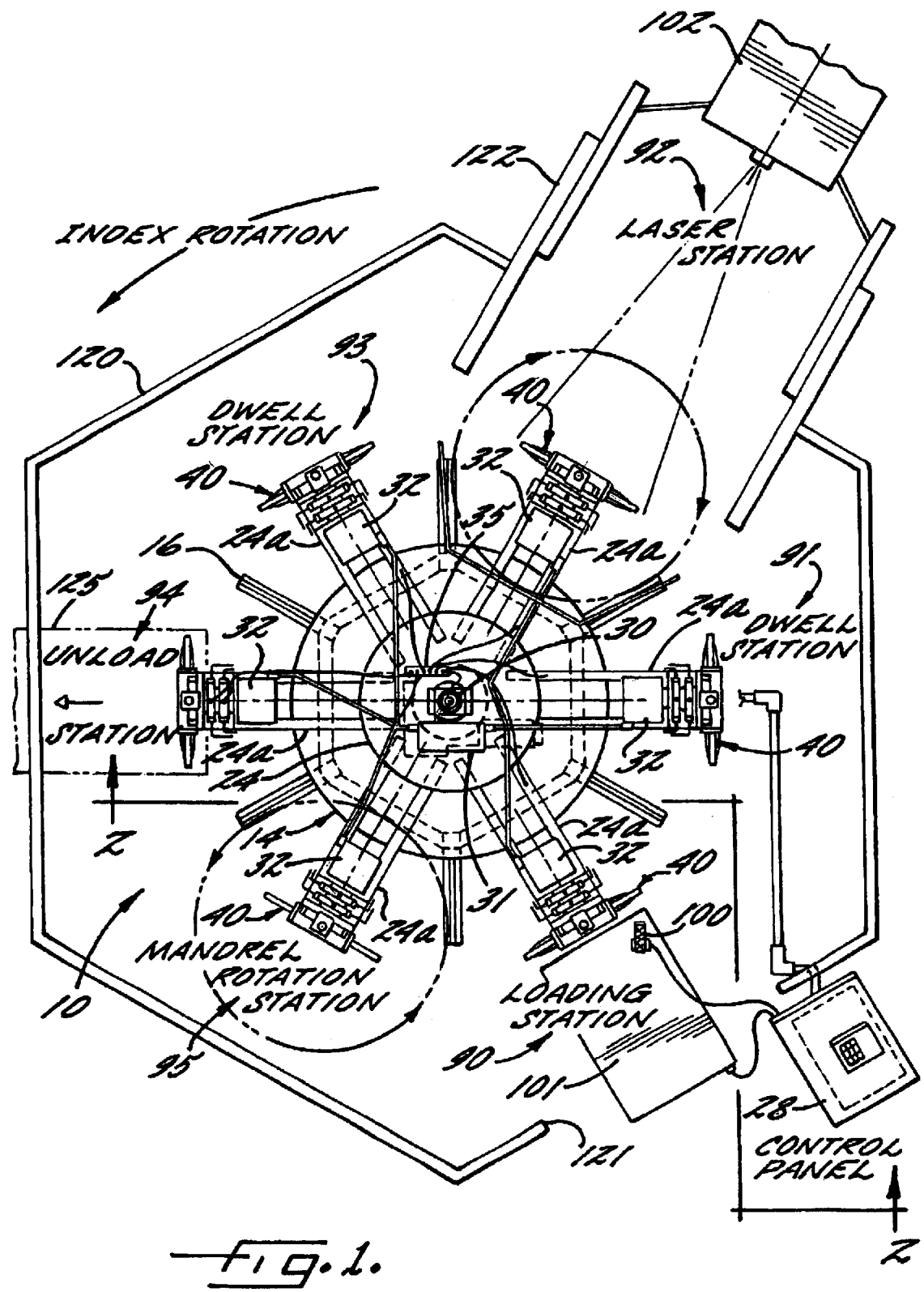
FIG. 1 is a partially diagrammatic top plan view of an illustrative machine in accordance with the invention for automatically creating laser etched wear patterns in denim pants.
Figure 4:
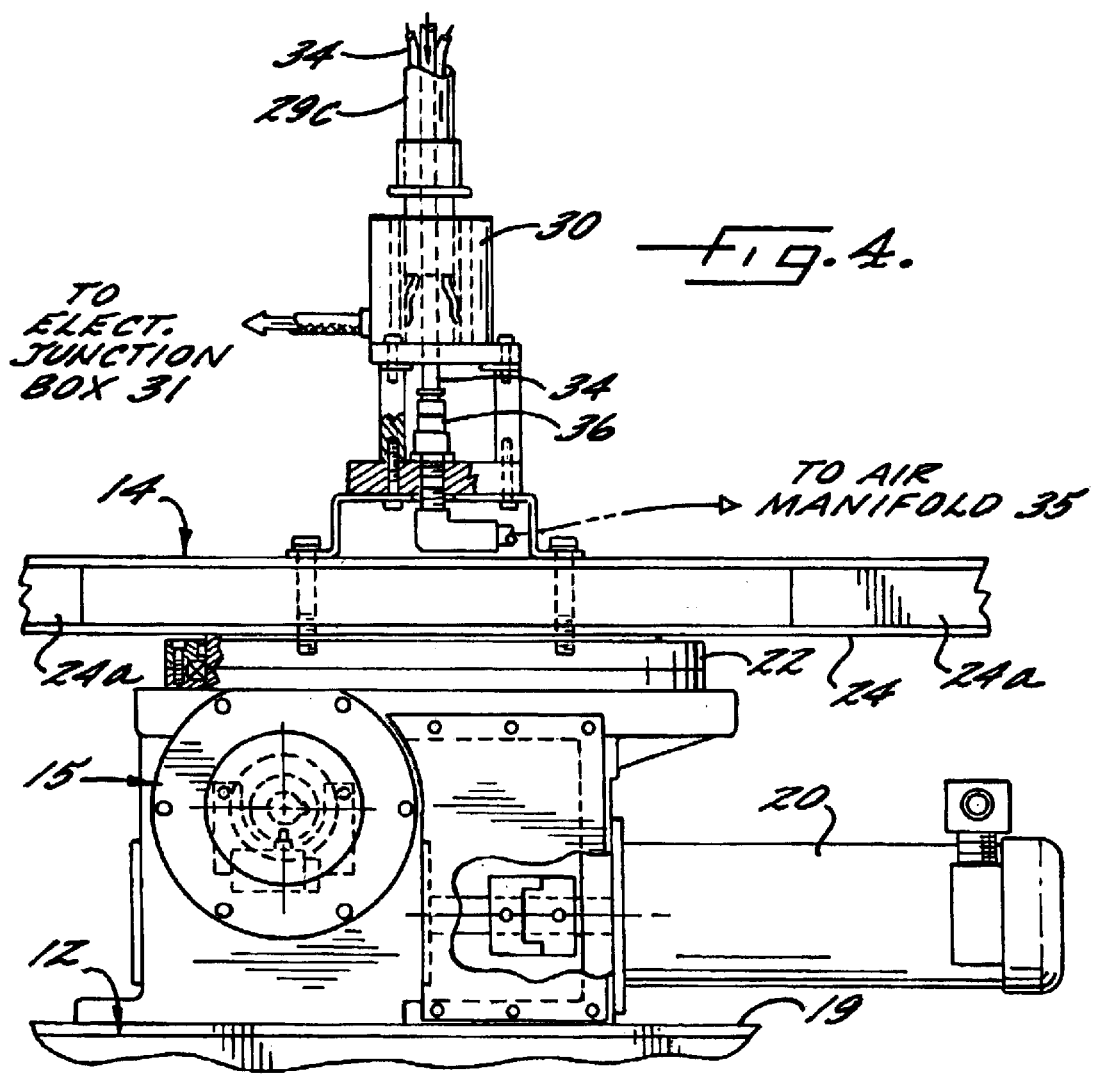
FIG. 4 is an enlarged fragmentary section of the rotary mounting and the air and electrical supply for the carousel of the illustrated machine.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particularly to the drawings, there is shown an illustrative machine 10 embodying the present invention adapted for continuously receiving individual pants 11 at a loading station and presenting them to a laser station where predetermined wear or like patterns are etched or burned into the fabric of the pants. While the invention will be described in connection with pants made of denim material, sometimes referred to as blue jean pants, it will be understood that the apparatus and method of the present invention may be used with pants made of other materials.

The illustrative machine 10 comprises a tower 12, a carousel 14, and a rotary index drive box 15 mounted on the tower 12 for sequentially indexing the carousel 14 in a rotary direction. The tower 12 comprises a base 16, upstanding structural support beams 18, and an upper platform 19 upon which the index drive box 15 is mounted. The index drive box 15 may be of a known type, such as a commercially available Model L Landcaster rotary indexer, comprising a DC drive motor 20 for driving a cam operated output drive which rotates a horizontal index table 22 upon which the carousel 14 is fixed for sequential indexing movement with the index table 24 upon periodically controlled energization of the motor 20. The carousel 14 includes a turntable 24 having radial arms 24a extending outwardly of the sides of the tower 12. For guiding rotational indexing movement of the turntable 24, a plurality of rollers 26 are supported at circumferentially spaced locations on the support tower 12.

For supplying electrical power to the carousel 14 from a main control panel 28, a skyhook 29 is provided which includes a first upstanding tubular member 29a coupled to the control counsel 28, a transversely extending leg 29b over the carousel 14, and a downwardly extending leg 29c coaxial with the turntable 24. Electrical power is provided via the skyhook 29 to a conventional slip ring coupling 30, and in turn to an electrical junction box 31 mounted on the top side of the turntable 24 adjacent the slip ring coupling 30. Power from the junction box 31 is connected to a plurality of station junction boxes 32 mounted at circumferential positions about the turntable. Pressurized air is supplied to the turntable 24 from an appropriate source via a supply line 34 through the skyhook 29 to a central air manifold 35 mounted on the turntable 24 via a conventional slip coupling 36 which permits rotary movement of the turntable 24 and manifold 35 relative to the supply line 34.

In accordance with an important aspect of the invention, the carousel includes a plurality of mandrels which are adapted to receive and precisely position pairs of pants in taut predetermined relation to a laser station for preprogrammed laser etching of wear patterns or other designs into the material of the pants. More particularly, the mandrels are identical in construction and are circumferentially spaced about the turntable so that pants can be successively placed on a mandrel at a loading station while mandrels are at other work or processing stations. To this end, the illustrated turntable 24 includes a plurality of identical mandrels 40 supported in depending fashion at equal circumferentially spaced locations about the turntable. Each mandrel 40 comprises articulated linkage suspended from an overhead support plate 41 and designed for articulated movement between a contracted position which enables positioning of a pair of pants onto the mandrel and an expanded position which tautly supports front and back sides of the pants in predetermined relation to the turntable while accommodating different sizes and styles of pant. Since the mandrels 40 are identical in construction, only one will be described in detail.

Each of the illustrated mandrels 40 basically comprises waist expansion linkage 45, leg locating linkage 46, leg expansion linkage 48, and buttocks expansion linkage 49 suspended from the overhead mandrel support plate 41. It will be seen that the leg locating linkage 46 and leg expansion linkage 48 effectively define a pair of depending legs L over which a pair of pants may be positioned by lifting the pants upwardly about the mandrel 40 from an underside thereof. For purposes herein, references to front side and rear sides of the mandrel is in relation to the front and rear sides of a pair of pants to be positioned on the mandrel.

The mandrel support plate 41, which in turn is mounted in depending fashion from an end of a respective turntable leg 24a, in this instance has a generally T-shaped configuration comprising an upper rectangular plate portion 41a and a downwardly directed central leg portion 41b. For expanding and contracting the mandrel 40, as will become apparent, each mandrel has a respective air actuatable cylinder 50 vertically supported by brackets 51 in rearwardly extending relation to the upper support plate portion 41a. The cylinder 50 has a depending cylinder rod 50a with a drive bar 52 fixed thereto, which in turn is fixed to a vertical actuating rod 54 disposed in parallel relation to the air cylinder 50 and to the rear side of the support plate 41 for vertical movement with the cylinder rod 50a. Hence, actuation of the air cylinder 50, as will become apparent, to extend and retract the cylinder rod 50a, will simultaneously lower and raise the actuating rod 54.

For limiting upward positioning of a pair of pants 11 onto the mandrel 40 such that the waist of the pants is located in predetermined relation to the waist expansion linkage 45, a horizontal waist locating bar 55 is mounted on the depending leg portion 41b of the support plate 41. The waist locating bar 55 in this case is mounted in forwardly spaced relation to a front face of the upper support plate portion 41a (as shown in FIGS. 8 and 11).

The illustrated waist expansion linkage 45 comprises pairs of expandable links 45a, 45b (FIGS. 10 and 12) pivotally connected together at one end with the other ends of the links 45a pivotally connected to the support plate 41 and the other ends of the links 45b pivotally connected to lateral slider plates 45c, which are mounted on opposite sides of the depending support leg portion 41b for lateral outward movement. The lateral slider plates 45c have a general L-shaped configuration with one leg adjacent the underside of the support plate portion 41a and the other leg adjacent the depending support plate portion 41b. Outer leg links 46a of the leg locating linkage 46 in this case are pivotally mounted in depending relation from the slider plates 45c.

Figure 13:
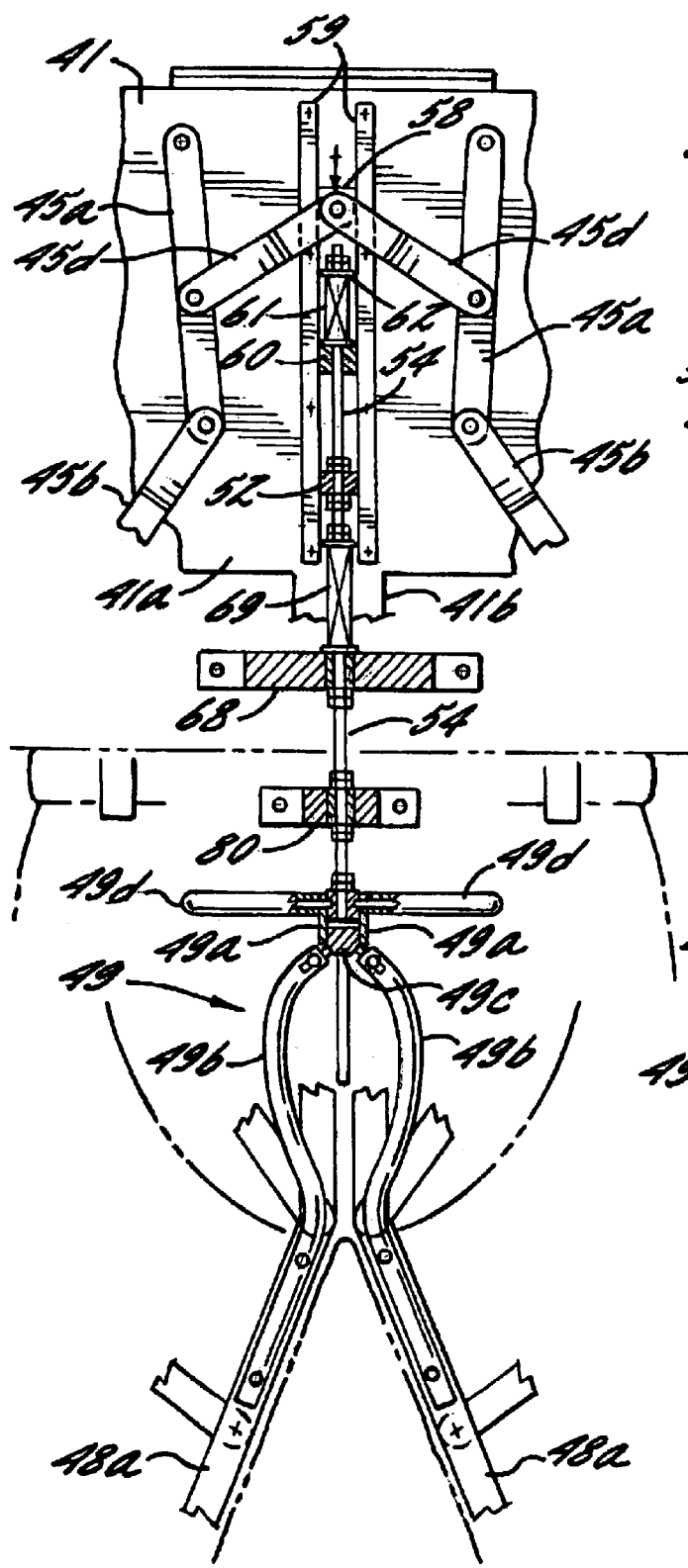
FIG. 13 is a fragmentary section of a portion of the mandrel actuating device, taken in the plan of line 13—13 in FIG. 14 and particularly showing the buttocks expansion linkage in an expanded condition.

For actuating the waist expansion linkage 45, actuating links 45d are pivotally connected at one end to a respective expandable link 45a intermediate the ends of the expandable link 45a and the other end of each actuating link 45d is pivotally connected to the upper end of a common vertical slider plate 58 mounted for vertical movement between guide tracks 59 on the rear face of the support plate 41 (FIG. 13).

In keeping with the invention, a lost motion connection is provided between the mandrel actuating rod 54 and the waist expansion linkage 45 in order to permit predetermined expansion of the waist expansion linkage 45, based upon the waist size of a pair of pants to be processed. In this instance, the vertical slider plate 58 has a transversely extending bar 60 fixed thereto with an aperture through which the actuating rod 54 passes at a location remote from the upper end of the actuating rod 54. A spring 61 is interposed between the slider plate bar 60 and a washer 62 fixed to the upper end of the actuating rod 54. Hence, downward movement of the actuating rod 54, in response to actuation of the air cylinder 50, will move the bar 60 and slider plate 58 downwardly by reason of the spring 61 bearing against the bar 60. It will be seen that downward movement of the slider plate 58 will draw the ends of the actuating links 45d connected thereto downwardly, forcing the expandable links 45a, 45b, slider plates 45c, and outer leg links 46a laterally outwardly to completely, fill in the waist of a pair of pants positioned on the mandrel 40 (as best seen in FIG. 12).

In keeping with the invention, expansion of the waist expansion linkage 45 may be selectively and positively limited for the particular waist size of the pants 11 to be processed. To this end, a plurality of motion limiting links 45e are pivotally connected between affront side of the support plate 41 and the lateral slider plates 45c It will be seen as the lateral slider plates 45c move laterally outwardly, the lower ends of the motion limiting links 45e also pivot in an outward direction.

For selectively limiting pivotal movement of the motion limiting links 45e, and hence lateral movement of the lateral slider plates, motion limiting pins 64 are positioned in selected apertures 65 in the front side of the support plate 41 for stopping outward movement of the links 45e. The apertures 65 in this case are formed in upwardly and outwardly inclined rows, designated A, B and C, with the apertures 65 in each row being vertically designated by the numbers 1, 2, 3 and 4. Positioning of the pins 64 in apertures B2, for example, as illustrated in FIG. 9, limits pivotal movement of the motion limiting links 45e to the position of the pins 64, which in turn limits outward lateral movement of the lateral slider plates 45c for the predetermined waist size of the pants to be processed, as determined by the distance about the mandrel 40, in this case about the outer leg links 46a at a location immediately below the waist locating bar 55. Repositioning of the pins 64 one aperture upwardly in a row permits progressively greater pivotal movement of the motion limiting links 45e, and hence, greater lateral movement of the slider plates 45c and outer leg links 46e, corresponding to a one-half inch larger waist size for a pair of pants to be positioned on the mandrel. Moving the pins 64 from position B4 to C1, similarly increases outward movement of the waist expansion linkage 45, corresponding to a one-half inch greater waist size.

It will be seen, therefore, that upon actuation of the air cylinder 50 and downward movement of the vertical slider plate 58, the waist expansion linkage 45 and outer leg links 46a will be expanded outwardly a determined amount, as established by the setting of the pins 64 in the forward side of the support plate 41 for the particular waist size of pants to be processed. When the motion limiting links 45e engage the pins, downward movement of the vertical slider plate 58 and expansion of the waist expansion linkage will be stopped while the actuator rod 54, which is fixed to the air cylinder rod 50a continues to move downwardly against the force of the lost motion spring 61 interposed between the upper end of the actuating rod 54 and the drive bar 60 fixed to the slider plate 58. Such continued downward movement of the actuator rod 54 is effective for fully actuating the leg locating linkage 46, as will become apparent, such that the outer leg links 46a are located in predetermined precise angular relation to the slide plates 45c.

The leg locating linkage 46 in this instance includes pairs of pivotal lock links 46b, 46c which are pivotally connected together at a common end, with the other end of each link 46c connected to a lower end of a respective lateral slider plate 45c and the other end of the link 46b pivotally connected to the outer leg link 46a at a location below the waist locating bar 55 and the upper end of the outer leg link 46a. The outer leg links 46a in this case each is an integral member extending from the respective lateral slider plate 45c to the lower end of the mandrel with slight inward bend near the upper end.

For actuating the leg locating linkage 46, respective actuating links 46d are pivotally connected between the commonly joined ends of the lock links 46b, 46c and one end of a cross bar 68 positioned on the actuating rod 54 for relative vertical movement. A lost motion connection, comprising a spring 69 (FIG. 12) mounted on the actuating rod 54 in interposed relation to the cross bar 68 and a washer fixed to the actuating rod, is effective for moving the cross bar 68 downwardly, in response to downward movement of the actuating rod 54, causing downward pivotal movement of the lock links 46b, 46c until they reach respective stops 71, which locate the outer leg links 46a in predetermined full extended positions with respect to the lateral slider plates 45c Upon movement of the lock links 46b, 46c to their locked position, the spring 69 permits continued downward movement of the actuating rod 54 relative to the cross bar 68 to complete actuation of the leg expansion linkage 48, as will become apparent.

The leg expansion linkage 48 comprises inner leg links 48a each pivotally connected in downwardly extending fashion from the lower support plate portion 48a and vertically spaced pairs of expandable links 48b, 48c and 48d, 48e and 48f, 48g which are progressively shorter in length in a downward direction. The expandable links 48c, 48e, 48g each having a lower end pivotally connected to an inner leg link 48a and an upper end connected to a respective cross bar 74, 75, 76 through which an auxiliary actuating rod 78 extends. The expandable links 48b 48d and 48f each have a lower end pivotally connected to the outer leg link 46a and an upper end pivotally connected to a respective cross bars 74, 75, 76.

For actuating the leg expandable links 48b, 48c, and 48d, 48e and 48f, 48g, actuating links 48h (FIG. 12) each are pivotally connected between one of the auxiliary actuating rods 78 and a cross bar 80 fixed to the actuating rod 54. Lost motion connections, comprising springs 81, 82, 84 interposed between respective cross bars 74, 75, 76 and washers fixed to the auxiliary actuating rod 78, transmit motion from the auxiliary rods 78 to the cross bars 74, 75, 76. Hence, downward actuating movement of the actuating rod 54 will move the cross bar 80 and auxiliary actuating rods 48h downwardly, with the springs 81, 82 and 84 forcing the cross bars 74, 75, 76, pivoting the expandable links 48b–48g and forcing the inner leg links 48a away from the outer leg links 46a to a fully expanded condition.

It will be understood that while actuation of the waist expansion linkage 45, outer leg locating linkage 46, and leg expansion linkage 48 have been separately described, actuation of the air cylinder 50 and downward movement of the cylinder rod 50 and auxiliary actuating rod 54 will simultaneously actuate each of the three articulated linkages 45, 46, 48 with the lost motion connecting springs permitting each linkage to expand outwardly to the size and style of pants positioned on the mandrel.

Figure 14:
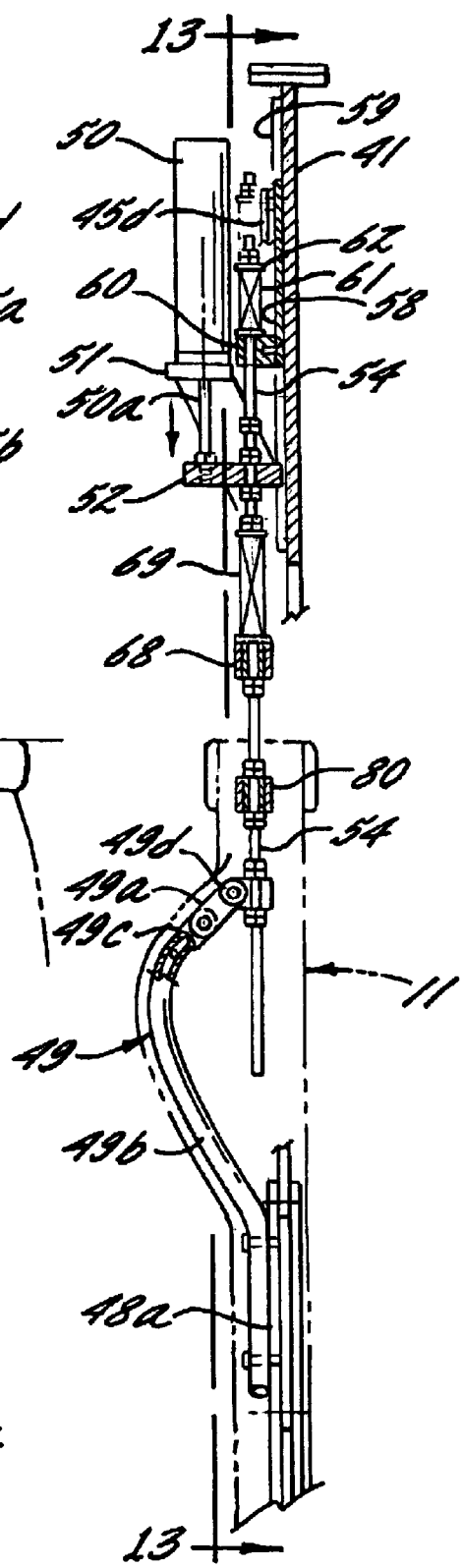
FIG. 14 is a vertical section of the actuating device shown in FIG. 13.
Figure 15:
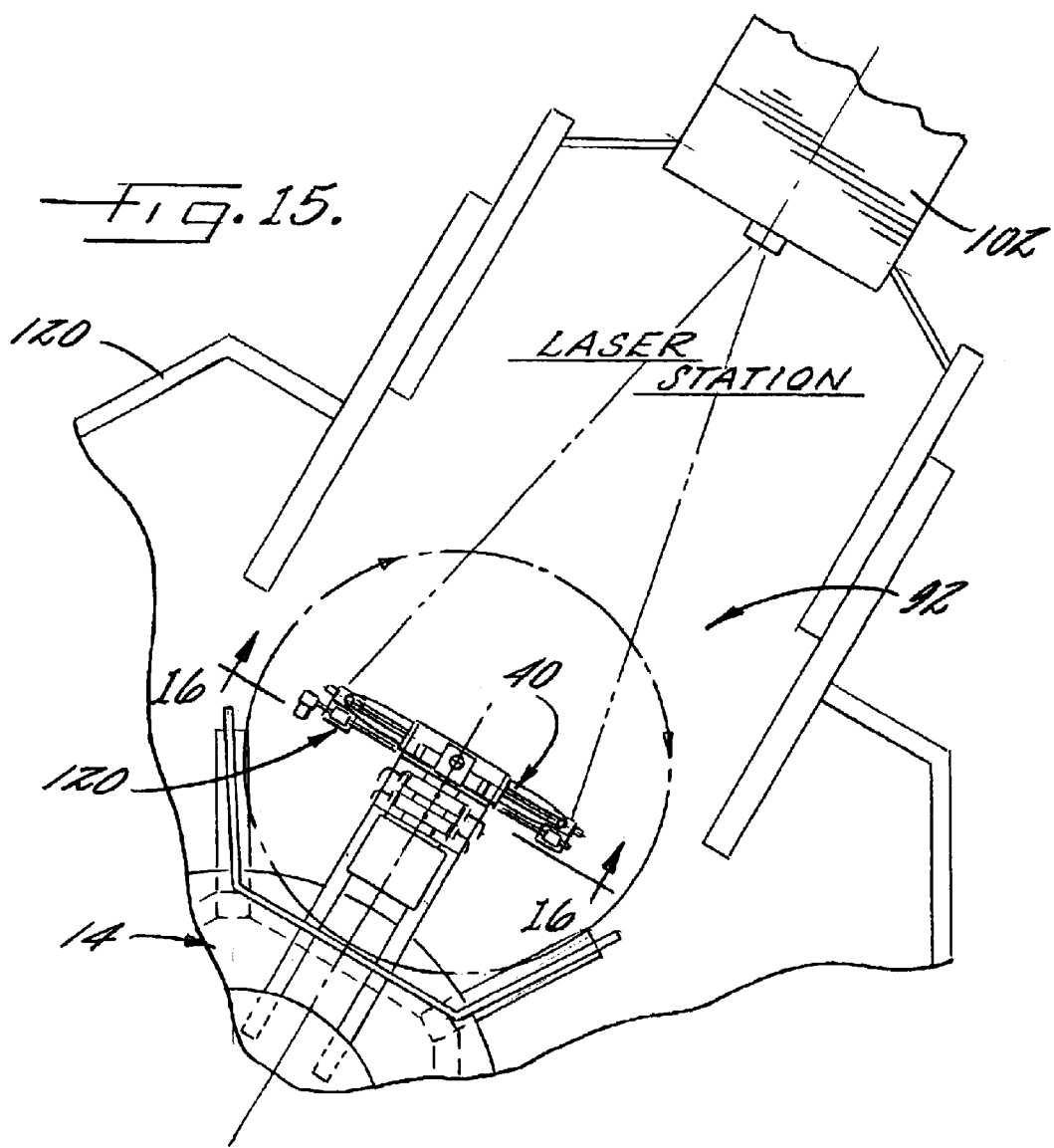
FIG. 15 is an enlarged top view of the laser station of the illustrated machine.
Figure 18:
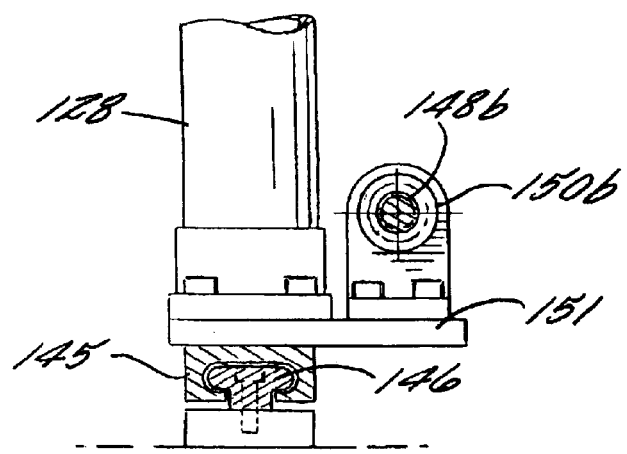
FIG. 18 is an enlarged fragmentary section of a slide and lateral drive screw of the mandrel alignment device, taken in the plane of line 18—18 in FIG. 17.

In keeping with the invention, the buttocks expansion linkage 49 also is simultaneously actuatable in response to downward movement of the actuating rod 54 and is effective for expanding the buttocks area of the pants 11 which typically has excess material. The buttocks expansion linkage 49 in this instance comprises a pivot link 49a pivotally connected to the actuating rod 54, and a pair of bendable links 49b coupled in diverging directions between the pivot link 49a and a respective inner leg link 48a (FIGS. 13 and 14). The flexible links 49a may have a composite construction comprising an inner flexible conduit, such as a commercially under the name Liquid Tite, which is covered by an outer heat shrink PVC tubing. The bendable links 49b in this case are coupled to respective legs of a Y-shaped connector 49c fixed to the end of the pivot link 49a. It will be seen that downward movement of the actuating rod 51, upon actuation of the air cylinder 50, will cause the pivot links 49a to pivot outwardly, as depicted in FIG. 14, forcing the bendable links 49b outwardly to tautly fill out any excess material in the buttocks of the pants supported on the mandrel. To further facilitate outward rounded expansion of the buttocks area of the pants, a pair of outwardly extending expansion rods 49d, also preferably made of a composite flexible construction, are mounted in laterally extending relation from an upper end of the pivot link 49a.

From the foregoing, therefore, it can be seen that upon setting of the pins 64 in the appropriate apertures 65 in the support plate 41 for the waist size of the pants to be positioned on the mandrel 40, actuation of the air cylinder 50, will simultaneously expand the waist linkage 45, locate the outer leg linkage 46 in a predetermined outwardly extended position, and expand the leg expansion linkage 48 and buttocks expansion linkage 49 such that the pant is tautly held on the mandrel in a predetermined substantially wrinkle free condition. Not only can the waist expansion linkage 45 be adjusted for the particular waist size of pant to be processed, the lost motion connections between the actuating rod 54 and the waist reduction linkage 45, the outer leg locating linkage 46, and the leg expansion linkage 48, enable proper expansion of the respective linkage for the particular style of pants to be processed, while allowing the actuating rod 54 to continue to fully actuate each of the other linkages as required.

With reference to FIGS. 20–23, a mandrel 40 similar to that described above is shown with alternative means for expanding the buttocks area of pants positioned on the mandrel. In this case, the mandrel 40 includes a pair of rearwardly mounted elongated expandable and deflatable bladders 155. The bladders 155 each are individually inflatable and deflatable from a respective pressurized inlet line 156 connecting with an upper end thereof. For supporting the bladders 155 on the mandrel 40, respective mounting plates 158 are fixed by means of a respective mounting bar 159 to the link 48h of the respective leg expansion linkage 48 and the bladders 155 each have a downwardly opening pocket 157 on the rear side for positioning over the mounting plate 158 with lower portions of the bladders 155 extending in depending relation to the mounting plates 158 generally parallel to the legs of the mandrel over which the pants are positionable. For enabling selected expansion of the bladders 155, the air supply lines 156 are connected to a common T 160, which in turn is connected to an air supply line 161. The air supply line 161 is connected through a solenoid control valve 162 to a respective air supply port 164 from an air manifold 165, which in turn which is connected to a central pressurized air supply. It will be understood that the buttocks expansion bladders 155 for each of the plurality of mandrels 40 may be connected to a respective port of the air manifold 165.

Figures 20, 21:
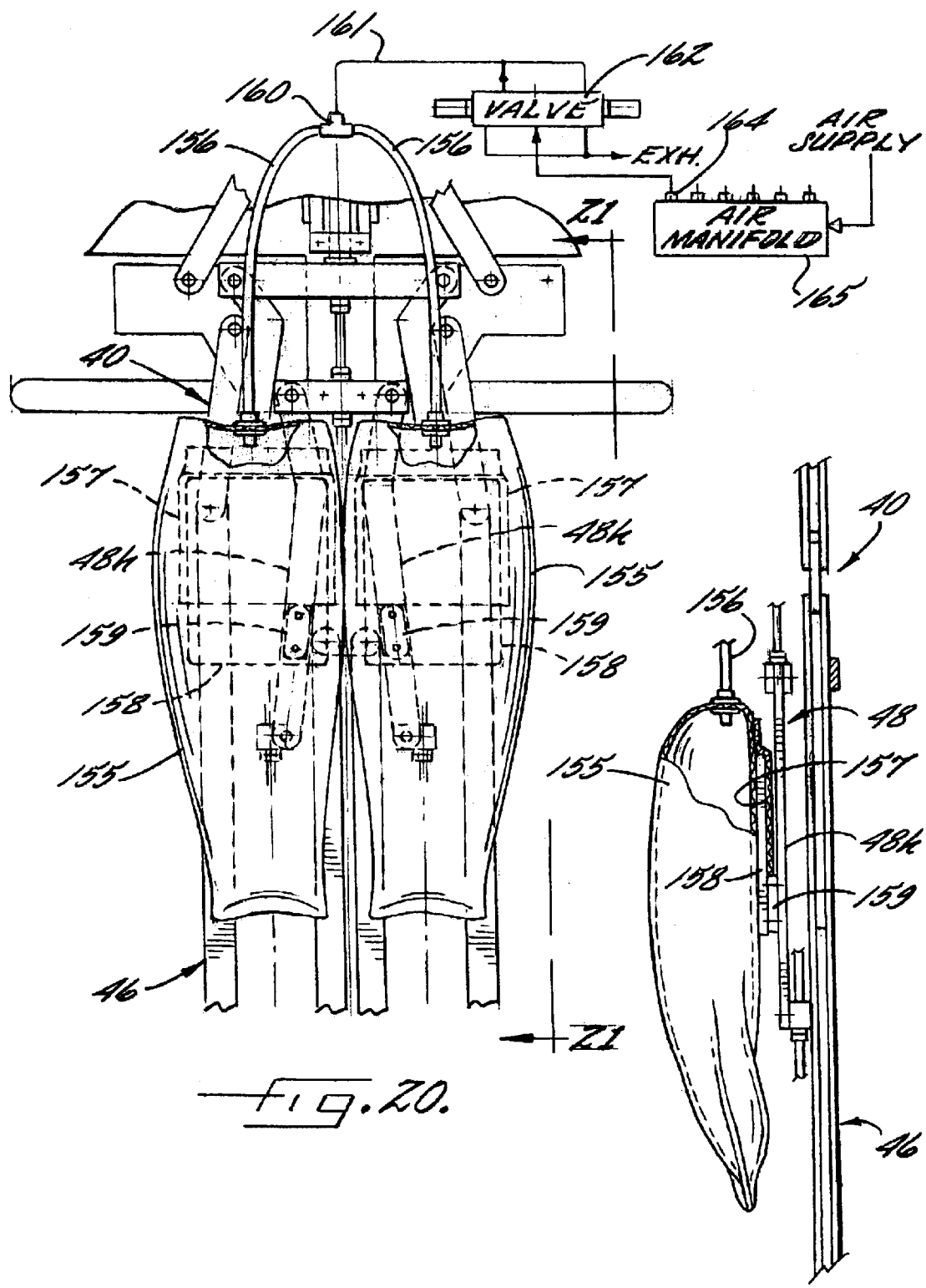
FIG. 20 is a partial front view of an alternative embodiment of mandrel with expandable bladders for tautly expanding and holding the buttocks area of pants.
FIG. 21 is a side elevational view of the mandrel shown in FIG. 20, with the bladders in a deflated condition.

When the bladders are in their deflated condition, such as shown in FIGS. 20 and 21, a pair of pants can be positioned over the legs of the mandrel and the bladders 155. Upon actuation of the control valve 162 and communication of pressurized air to the bladders 155, the bladders are expanded, as depicted in FIGS. 22 and 23, to fill out and tautly support the buttocks areas of the pants. The bladders 155 preferably have larger upper portions about which the buttocks of the pants are positioned and smaller proportioned lower portions which fill out and tautly support the upper portions of the pant legs.

In carrying out the invention, each of the mandrels 40 is individually, automatically operable such that the carousel 14 may simultaneously process a plurality of such pant-carrying mandrels 40 through a multiplicity of process stations for enhanced efficiency in processing. In the illustrated embodiment, the carousel 14 is adapted to process mandrels 40 from a loading station 90, to a first dwell station 91, a laser station 92, a second dwell station 93, an unloading station 94, and a mandrel rotation station 95, and then return to the loading station 90. For controlling and actuating each mandrel air cylinder 50, each mandrel has an associated solenoid valve 98 (FIGS. 5 and 7B), in this case mounted on the turntable leg 24a adjacent the upper end of the mandrel 40, which can be controlled through an appropriate master controller. The valve 98 includes a solenoid piston rod 98a, the position of which dictates the flow of pressurized air from the air manifold 34 to either top and bottom sides of the cylinder 50, for respectively lowering and raising the cylinder rod 50a, and hence actuating rod 54 of the respective mandrel 40.

In keeping with the invention, the machine 10 can be efficiently and safely loaded and operated by a single operator. With a mandrel at the loading station 90, as depicted in FIG. 1, with the front of the mandrel 40 facing outwardly and the articulated linkage thereof in a contracted or loading condition, an operator may position a pair of pants onto the mandrel 40, as described previously, by raising the pants onto the mandrel 40 up to the waist locating bar 55, whereupon the air cylinder 50 for the mandrel may be actuated to expand the articulated mandrel linkage 45, 46, 48, and 49, in this case by the operator actuating a foot pedal switch 100 at the loading station 90, which causes the mandrel to support the pants in taut and predetermined relation to the support plate 41 and turntable 24. In the event that the mandrel 40 has buttocks expansion bladders 155, such as shown in FIGS. 20–23, actuation of the solenoid controlled valve 162, such as by a second actuation of the foot pedal 100, will expand the bladders 155 to fill out and tautly support the buttocks areas of the pants. It will be understood by one skilled in the art that to facilitate positioning of pants onto the mandrel without catching onto the linkage, the mandrel linkage may be covered by a soft fabric material which permits expansion and contraction of the mandrel linkage. With the pant loaded onto the mandrel with the front side facing outwardly, the mandrel 40 is ready for indexing to the next processing station.

For enhancing the safety of the operator and for ensuring completion of processing at other of the processing stations before the carousel may be indexed, it will be understood that appropriate controls may be provided. In the illustrative embodiment, a conventional pressure sensitive mat 101 is provided at the loading station, upon which the operator stands during loading of pants onto the mandrel. Prior to indexing of the carousel 14, the operator must step off of the pressure sensitive mat 101, which initiates a signal sensed by the master controller, and actuate and enabling switch on the control panel 28, also connected to the master controller. When the master controller further senses that processing has been completed at each of the other process stations, the index motor 20 will be energized to rotate the carousel 14 and position the mandrels to the next station. In this case, a mandrel 40 is indexed from the loading station 90 to a first dwell station 91. While at the dwell station 91 the mandrel 40 is maintained in a ready position, while loading and processing occurs at other of the stations, as will become apparent, following the completion of which the carousel 14 is again indexed, moving the mandrel from the first dwell station 91 to the laser station 92. The laser station 92 includes a laser device 102 of a known type, such as is commercially available from LasX Industries, Inc., which upon energization, is operable for generating preprogrammed laser beams.

In keeping with an important aspect of the invention, upon indexing of a pant supporting mandrel 40 to the laser station 92, a front side of a pair of pants supported by a mandrel 40 is presentable in precise predetermined relation to the laser device 102 for enabling laser etching in repeatable centered fashion on successively presented pants regardless of size and style. It can be seen that when the waist expansion linkage 45, leg expansion linkage 48, and buttocks expansion linkage 49 are in their expanded conditions, a pant supported on the mandrel is held and maintained in a taut, relatively flat, wrinkle free condition with the front side facing the laser 102. Moreover, as indicated above, actuation of the mandrel linkage causes the outer leg links 46a of the mandrel 40 to be pivoted into predetermined outwardly angled relation to the lateral slider plates 45c, thereby locating the pant legs in predetermined relation to the laser.

In further carrying out the invention, a mandrel alignment device, located external to the mandrels, is provided at the laser station for selectively engaging, positioning, and positively retaining mandrels indexed to that station in more precise predetermined relation to the laser device prior to an etching operation. In the illustrated embodiment, a floor mounted mandrel alignment device 120 is located at the laser station 92 immediately below the positioning location of a mandrel 40 indexed to such station. The mandrel alignment device 120 includes a pair of upstanding alignment heads 121 which can be selectively moved into engagement with the leg linkage of each mandrel 40 indexed to the laser station 92 for precisely locating and positively holding the mandrel 40 in position in front of the laser device 102. The alignment heads 121 of the mandrel alignment device 120 in this case comprise a pair of upwardly facing cup-shaped members, which each define a respective upwardly and outwardly tapered mandrel-receiving chamber 122 for receiving the lower end of a respective mandrel alignment or extension bar 124 fixed in depending relation to the lower end of a respective outer leg link 46a. The alignment or extension bar 124 in this case is fixed at an angle to the respective outer leg link 46a such that when the mandrel 40 is in its expanded condition the extension bar 124 is substantially vertically oriented. The mandrel extension bars 124 in this case each are provided with a wear pad 125 at a lower terminal end to facilitate guiding relative movement of the alignment heads 121 and mandrel extension bars 124 for preventing wear to the extension bars.

Figure 19:
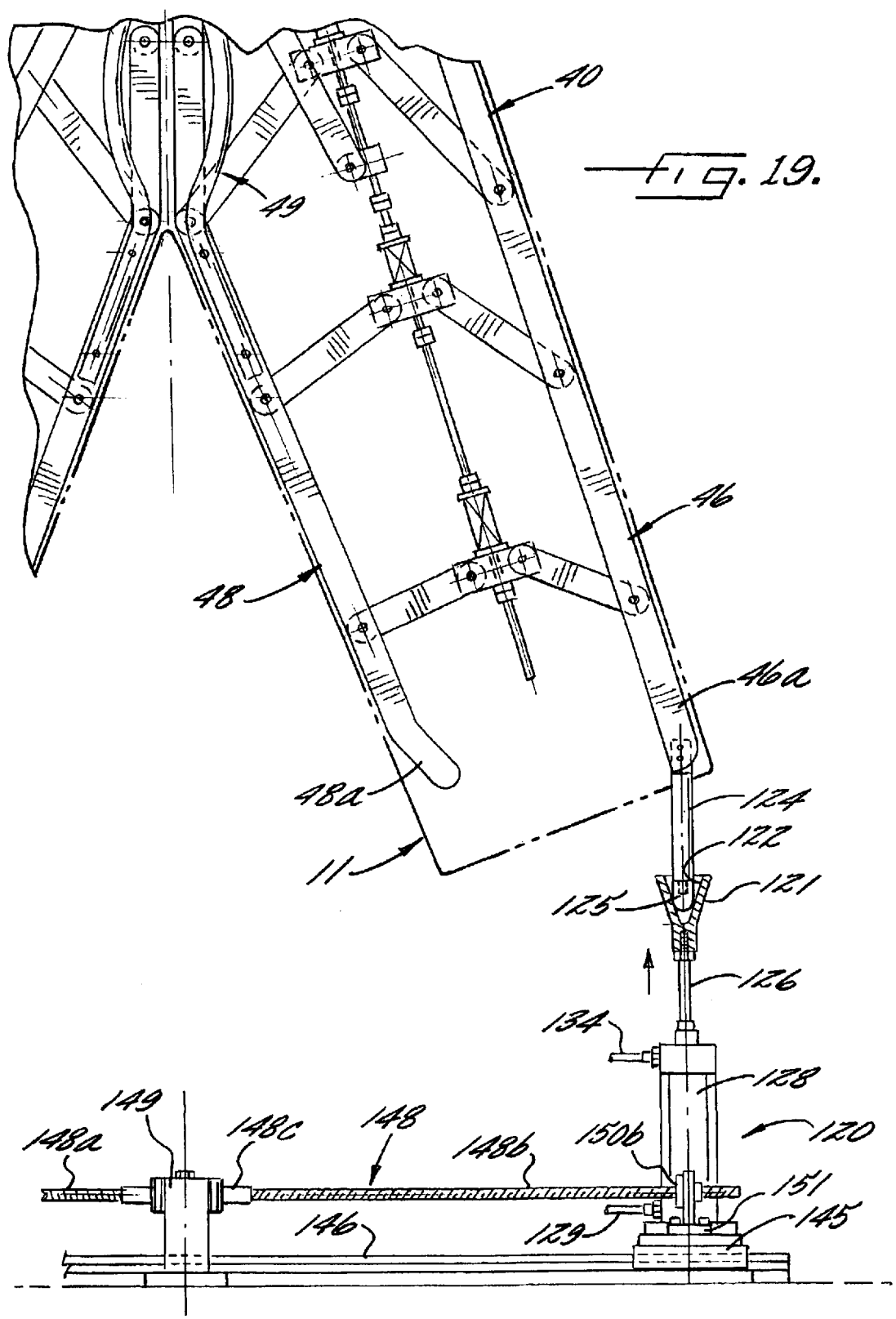
FIG. 19 is an enlarged front view, in partial section, showing the mandrel alignment device in a raised mandrel aligning position.

For selectively moving the alignment heads 121 from a lowered ready position, as depicted in FIG. 16, to a raised mandrel aligning position, depicted in FIG. 19, the alignment heads 121 in this instance each are mounted on the rod 126 of a respective upwardly oriented pneumatic cylinder 128. The illustrated cylinders 128 are a known double actuating type, whereby the piston rods 126 and alignment heads 121 can be raised by communicating pressurized air through a respective first inlet line 129 to a lower end of the respective cylinder 128. The inlet lines 129 in this case communicate through a common T 130 which in turn is connected by a supply line 131 to a pressurized air 4-way control valve 132. For lowering the alignment heads 121, pressurized air is communicated to the cylinders 128 via second inlet lines 134, which in turn communicate with a common T 135 coupled to the 4-way control valve 132 by an inlet line 136. Pressurized air is supplied to the control valve 132 from an appropriate pressurized air source through an inlet line 138, which in turn communicates with the 4-way valve 132 through a pressure regulator 139. It can be seen that when a pant carrying mandrel 40 is advanced to the laser station 92 with the linkage of the mandrel in an expanded condition, actuation of the cylinders 128 to raise the alignment heads 121 will cause the upwardly opening chambers 122 to receive and engage the depending extension bars 124 of the mandrels 40 and guide the mandrels 40, via movement along the tapered walls of the cup chambers 122, into predetermined centered relation with the alignment cylinders 128, and in turn, the laser device 102. It will be understood by one skilled in the art that operation of the 4-way control valve 132, and hence the alignment heads 121, can be controlled by the machine control in sequence with and in timed relation to operation of the carousel.

In carryout out the invention, in order to even more precisely align the mandrels 40 for particular sizes or styles of jeans to be etched at the laser station 92, the alignment heads 121 of the alignment device 120 are laterally positionable relative to each other. To this end, the alignment head carrying cylinders 128 each are mounted on a respective slide plate 145 which is positionable along a guide track 146 oriented directly below the mandrel positioning location at the laser station. The slide plates 145 are provided with appropriate support bearings to facilitate lateral movement on the track 146, as depicted in FIG. 16.

For selectively moving the alignment heads 121 along the track 146, a screw drive 148 is provided which includes a pair of adjustment screw sections 148a, 148b connected by a central connecting link 148c supported within a centrally mounted bearing block 149 for rotational movement. Opposite ends of the adjustment screw sections 148a, 148b are engageable with respective nuts 150a, 150b which each is supported by a plate 151 extending outwardly from a respective air cylinder slide 145. In order to permit simultaneous inward and outward movement of the slide plates 145 and alignment heads 121 relative to each other, the adjustment screw section 148a and nut 150a are threaded oppositely to that of the adjustment screw section 148b and nut 150b. For example, if the adjustment screw section 148a and nut 150b have right-hand threads, the adjustment screw section 148b and nut 150b have left-hand threads. Rotation of the adjustment screw 148 through an appropriate rotary drive 154, preferably controlled by the machine control, is effective for laterally adjusting the spacing between the alignment heads 121 for the particular size and style of jean to be etched at the laser station.

With the mandrel 40 supporting the pants positioned and positively retained by the alignment heads 120 in predetermined relation to the laser device 102, it will be understood that a preprogrammed laser beam can burn or etch a desired wear pattern 104 or other design in selective areas of the front side of the pants, such as the designs depicted in the pants 11 shown in FIG. 3A. These laser etched patterns 104 may simulate actual wear and be located at specifically determined areas of the pants which typically receive maximum wear over prolonged usage, such as in the knee and pocket areas. It will be understood that such predetermined positioning of the pant in relation to the laser device 102 enables reliable, repetitive, substantially identical wear patterns to be imparted in pants successively presented to the laser station. Following completion of the laser etching of the pant carried by the mandrel 40 of the laser station, the alignment heads 121 may be retracted through reverse actuation of the pneumatic cylinders 128.

Figure 7A:
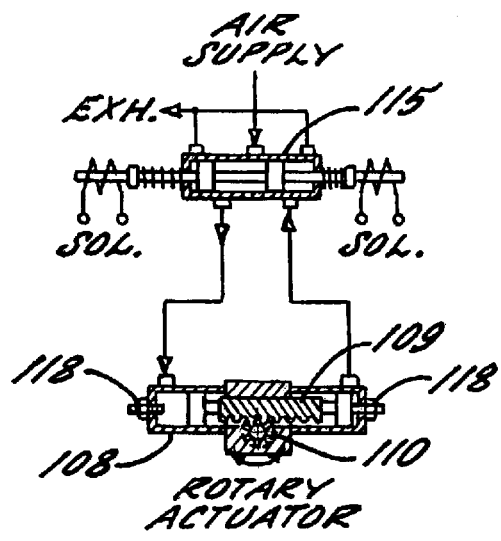
FIGS. 7A and 7B are partially diagrammatic sections of actuating devices for the mandrel shown in FIG. 5, taken in the planes of lines 7A—7A and 7B—7B, respectively.
Figure 7B:
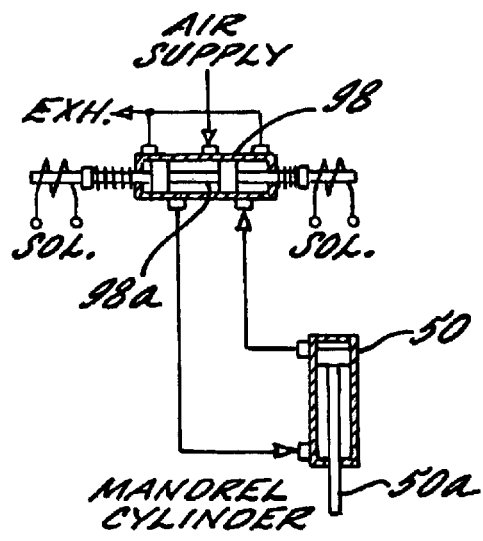

In carrying out still a further feature of the invention, following laser etching of the front side of a pair of pants supported by a mandrel 40 at the laser station 92, the mandrel 40 can be automatically rotated to present the rear side of the pants in predetermined relation to the laser device 102 for etching wear patterns 105 on the rear side of the pants, such as depicted in FIG. 3B, in an accurate and repeatable manner. In the illustrated embodiment, each mandrel 40 is supported from a rotary actuator 108 mounted on a turntable leg 24a adjacent the end thereof by means of support bracketry 107 (FIGS. 6 and 7A). The rotary actuator 108, which may be of a conventional type, includes an air cylinder driven rack 109 which rotates an output shaft 110, which in turn is connected through a coupling 110a to a shaft 111 that carries a pivot plate 112 at the lower end thereof, secured to an upper weldment 114 of the mandrel support plate 41. A solenoid operated control valve 115, shown in FIG. 7A, is operable for directing air into either side of the cylinder 108 for effecting 180° rotational movement of the shafts 110, 111, and hence, the mandrel 40 supported thereby. Specifically, rotation of the rotary index shafts 110, 111 in one direction will rotate the mandrel 180° to present the back side of the pair of pants supported by the mandrel 40 in predetermined relation to the laser device 102 To enable precise adjustment in such rotary movement, adjustment screws 118 are provided in opposite ends of the rotary actuator cylinder 108 for precisely stopping the cylinder movement. Since the back side of the pants positioned on the mandrel 40 is supported in taut, substantially wrinkle free condition in predetermined relation to the laser, etching of a preprogrammed design also may be imparted to the rear side of pants indexed to the laser station 92 on a repeatable basis.

For protecting the operator and any other personnel in the surrounding the area, the machine 10 in this instance is substantially contained within an enclosure 120 (FIG. 1). The illustrated enclosure 102 completely surrounds the machine 10, with an access opening 121 at the loading station 90, and with the laser device 102 supported within a light diffusing housing 122 for sliding movement within the enclosure 120. The enclosure 120 and laser housing 122 preferably are made of Lexon plastic panels, which, while being transparent, sufficiently diffuse laser beams that might be directed outwardly of the machine. The laser device housing 122 in this instance is retractable between an operative position, extending into the enclosure 120 during operation of the laser device 102 to a retracted position as depicted in FIG. 1, which permits indexing of the carousel.

Following completion of laser etching of the rear side of the pants at the laser station 92, the laser device 102 is moved to its withdrawn position, shown in solid lines in FIG. 1, in response to which a signal may be directed to the master controller to permit indexing of the carousel 14 to the next station. In this instance, a mandrel 40 at the laser station 92 is indexed to a second dwell station 93, which enables loading and processing at other of the stations to take place. Following that processing, a mandrel 40 is indexed from the second dwell station 93 to the unload station 94. At the unload station 91, the solenoid valve 98 is actuated to raise the cylinder rod 50a and retract the mandrel linkage 45, 46, 48, and 49, which permits a pair of pants supported by the mandrel to freely fall onto an unload conveyor 125 for removal from the machine 10. In the event the mandrels 40 have buttocks expanding bladders 155, such as shown in FIGS. 20–23, advancement of the mandrel to the unload station can actuate an appropriate switch to reverse the solenoid 162 and deflate the bladders 155 to facilitate removal of the pants from the mandrel.

Subsequent indexing of the carousel 14 thereupon moves a mandrel 40 from the unload station 94 to the mandrel rotation station 95, where, through reverse actuation of the solenoid valve 115, the mandrel 40 is rotated in an opposite 180° direction to again direct the front of the mandrel 40 outwardly of the machine for receiving another pair of pant, upon subsequent indexing of the mandrel to the loading station 90.

It will be understood by one skilled in the art that following etching of the predetermined wear patterns into a pair of pants 11 processed by the machine 10, the pants 11 still may be stone washed in a conventional manner. The stone washing process, however, may be substantially shortened. Indeed, the machine of the present invention not only is operable for providing more versatile and realistic simulated wear patterns, but the overall processing time may be less than conventional stone washing processes.

From the foregoing, an apparatus and method is provided for efficiently and reliably etching wear or other simulated wear patterns into denim pants using lasers. The machine accommodates different styles and sizes of denim pants, while presenting the pants to a laser station in taut predetermined relation to the laser device for repeatable preprogrammed laser treatment in a continuous manufacturing operation. The carousel-mounted mandrels further permit a plurality of pants to be simultaneously and safely processed with a single operator.

What is claimed is:

1. An apparatus for forming predetermined patterns into cloth material pants comprising laser device, a mandrel for supporting a pair of pants in a taut condition, a mandrel alignment device for engaging and locating said pants supporting mandrel in predetermined relation to said laser device, and said laser device being operable for imparting an etched pattern on a pair of pants supported by said mandrel without completely cutting through the cloth material of said pants for giving an exposed surface of the material a predetermined esthetic appearance.

2. The apparatus of claim 1 in which said alignment device is mounted remote from said mandrel and is selectively movable into engaging relation with said mandrel.

3. The apparatus of claim 2 in which said alignment device is mounted below said mandrel and includes at least one mandrel engaging element that is vertically movable from a retracted position into raised engaging relation with said mandrel.

4. The apparatus of claim 2 in which said alignment device moves the mandrel into predetermined aligned relation with said laser device as an incident to vertical movement of said engaging element.

5. The apparatus of claim 3 in which said engaging element positively retains said mandrel in aligned relation to said laser device upon movement into raised engaging relation with the mandrel.

6. The apparatus of claim 3 in which said engaging element includes an upwardly opening cup-shaped ember for receiving an alignment element of said mandrel as an incident to upward vertical movement of the engaging element.

7. The apparatus of claim 6 in which said cup-shaped member defines an upwardly and outwardly tapered recess for receiving and guiding the mandrel alignment element into predetermined aligned relation to said laser device.

8. The apparatus of claim 1 in which said mandrel includes a first depending articulated leg linkage and a second articulated leg linkage, said first and second leg linkage each being adapted or receiving a respective leg of a pair of pants positioned on the mandrel, and said alignment device includes a pair of alignment heads each of which is selectively movable into engagement with a respective one of said leg linkage for aligning said mandrel relative to said laser device.

9. The apparatus of claim 8 in which said alignment heads are vertically movable from a retracted inoperable position to a raised position in engaging relation with said mandrel first and second leg linkage.

10. The apparatus of claim 9 in which said alignment heads each have an upwardly opening recess for receiving and aligning a respective mandrel leg linkage.

11. The apparatus of claim 10 in which the recess of each alignment head has an upwardly and outwardly extending taper.

12. The apparatus of claim 8 in which each said alignment head is mounted on a rod of a selectively operable cylinder.

13. The apparatus of claim 8 in which said alignment heads are mountable for selected relative lateral movement with respect to each other for enabling lateral alignment of said first and second leg linkage relative to said laser device.

14. The apparatus of claim 13 in which each said alignment head is mounted on a respective slide, a selectively operable drive for laterally moving said slides with respect to each other.

15. The apparatus of claim 14 in which said drive includes a rotatable drive screw operably connected to said each slide for simultaneously moving said slides laterally with respect to each other as an incident to rotation of said screw.

16. The apparatus of claim 8 in which said mandrel is selectively actuatable from a retracted condition that permits positioning of a pair of pants on the mandrel and an expanded position that tautly supports the pants.

17. An apparatus for forming predetermined patterns into cloth pants comprising:

a carousel having a plurality of circumferentially spaced pant-receiving mandrels;

an indexing device for sequentially rotating said carousel to successively position said mandrels to a plurality of stations located about the carousel including a loading station, a laser station, and an unloading station;

said mandrels each being adapted to receive and support a pair of pants at the loading station for transfer to said laser and unloading stations, said laser station including a laser device, an alignment device at said laser station for engaging and locating a mandrel indexed to said laser station into predetermined relation to said laser device, and said laser device being operable for imparting a predetermined etched pattern at a predetermined location on a pair of pants supported by a mandrel to said laser station.

18. The apparatus of claim 17 in which said alignment device is mounted below a mandrel at said laser station and includes at least one mandrel engaging element that is vertically movable from a retracted position into raised engaging relation with said mandrel.

19. The apparatus of claim 17 in which each said mandrel includes a first depending articulated leg linkage and a second articulated leg linkage, said first and second leg linkage each being adapted for receiving a respective leg of a pair of pants positioned on the mandrel, and said alignment device includes a pair of alignment heads each of which is selectively movable into engagement with a respective one of said leg linkage for aligning said mandrel relative to said laser device upon alignment to said laser station.

20. An apparatus for forming predetermined patterns into cloth material pants comprising a laser device, a pants supporting mandrel having a pair of leg sections each for receiving a respective leg of a pair of pants supported on the mandrel, said mandrel being selectively actuatable from a retracted condition that permits positioning of a pair of pants onto the mandrel and an expanded condition that tautly supports the pants in predetermined relation to said laser device, and said laser device being operable for imparting an etched pattern on a pair of pants supported by said mandrel while in said expanded condition without completely cutting through the cloth material of said pants for giving exposed surface of the material a predetermined esthetic appearance.

21. The apparatus of claim 20 in which said mandrel each includes waist expansion linkage and expandable leg linkage for respectively expanding and tautly holding the waist and legs of a pair of pants positioned on the mandrel.

22. The apparatus of claim 20 in which said mandrel includes buttocks expansion linkage for maintaining the buttocks section of a pair of pants supported thereon in taut condition.

23. The apparatus of claim 21 in which said expandable leg linkage support the legs of a pair of pants positioned on the mandrel in flat condition for positioning in operative relation to said laser device.

24. The apparatus of claim 22 in which said buttocks expansion linkage maintains a rear buttocks area of pair of pants positioned on the linkage in a taut outwardly rounded condition for positioning in operative relation to said laser device.

25. The apparatus of claim 21 in which said mandrel includes a single actuating device for simultaneously actuating said linkage to expanded conditions, said actuating device including lost motion mechanisms for permitting individual expansion of said linkages for the particular size and style of pant supported on the mandrel.

26. The apparatus of claim 20 in which said mandrel includes at least a buttocks expanding bladder which can be pressurized from a deflated condition which permits positioning of a pair of pants onto the mandrel to an inflated position which tautly supports the buttocks area of the pants on the mandrel.

27. The apparatus of claim 26 in which said mandrel includes a pair of said buttocks expanding bladders each having a depending portion positionable into a respective leg of a pair of pants positioned onto the mandrel.

28. The apparatus of claim 21 in which said mandrel includes an actuating device, said waist expansion linkage includes pairs of expandable links, each pair of expandable links being coupled together at one end, one of the expandable links of each pair being pivotally connected to a respective laterally movable slider, and said expandable links being pivotal in response to actuation of said actuating device for laterally moving said lateral sliders outwardly with respect to each other to increase the distance about the waist expansion linkage.

29. The apparatus of claim 28 in which said expandable leg linkage includes outer leg links each connected to a respective one of said lateral sliders.

30. The apparatus of claim 20 in which each mandrel includes a horizontal waist locating bar disposed adjacent the waist expansion linkage for locating the upper waist portion of a pair of pants in predetermined relation to the mandrel during positioning of the plate onto the mandrel at the loading station.

31. The apparatus of claim 28 including a support plate from which the mandrel is supported in dependent fashion, said mandrel including at least one motion limiting link connected between the support plate and said sliders, and selectively positionable stops for limiting pivotal movement of said motion limiting link, and hence lateral movement of the lateral sliders, for the predetermined waist size of pants to be positioned on the mandrel.

32. The apparatus of claim 28, including a support plate from which the mandrel is supported in dependent fashion, said mandrel including motion limiting links connected between the support plate and said sliders, said plate being formed with a plurality of waist size apertures, and motion limiting pins positionable in selected of said apertures for limiting movement of the motion limiting links, and hence outward lateral movement of said lateral sliders for the predetermine waist size for pants to be positioned on the mandrel.

33. The apparatus of claim 28 in which said expandable leg linkage includes leg locating linkage and leg expansion linkage, said leg locating linkage includes outer leg links each coupled to a respective one of said lateral sliders, said leg locating linkage further including a pair of lock links associated with each outer leg link, each pair of lock links being pivotally connected together at one end, one of said lock links of each pair being pivotally connected to a respective outer leg said lock links each being pivotal a predetermined amount in response to actuation of said actuating device for locating the outer leg links in predetermined angular relation to said lateral sliders.

34. The apparatus of claim 33 in which said leg expansion linkage includes a pair of inner leg links, and vertically spaced pairs of expandable links, each pair of inner leg links expandable links being pivotally connected together at one end, one of the links of each pair of inner leg link expandable links being connected to a respective inner leg link, and said vertically spaced pairs of expandable links each being pivotal in response to actuation of said actuating device for moving each inner leg links outwardly relative to a respective outer leg links to tautly support the legs of a pair of pants positioned on the mandrel.

35. The apparatus of claim 22 in which said buttocks expansion linkage includes a pivot link and a pair of bendable links coupled in diverging relation to each other from said pivot link, and said pivot link being pivotal outwardly in a rearward direction in response to actuation of said actuating device for forcing the bendable links outwardly in the rearward direction to fill in a buttocks area of a pair of pants supported on the mandrel.

36. The apparatus of claim 20 in which said mandrel supports said pants with a front side facing laser device for enabling etching of said predetermined etched pattern at a determined location of a front side of said pants, and said mandrel being rotatable for enabling said laser device to etch a predetermined pattern at a predetermined location on a rear side of said pants while at said laser station.

37. A method for forming a pattern into cloth pants comprising the steps of:
    positioning a pair of cloth material pants onto a first expandable and retractable mandrel while the mandrel in a retracted position, expanding the mandrel to tautly support the pants on the mandrel, positioning the mandrel and the pants supported thereon in predetermined relation to a laser device, and actuating the laser device to etch a pattern into said pants without completely cutting through the cloth material of said pants for giving an exposed surface of the material a predetermined esthetic appearance.

38. The method of claim 37 including positioning the pants onto said first mandrel at a loading station, etching the predetermined pattern into said pants at a laser station, and moving said mandrel from said loading station to said laser station following expanding of the mandrel.

39. The method of claim 37 including moving said mandrel to an unloading station following etching of said predetermined pattern onto a pair of pants positioned on the mandrel at the laser station, and retracting the mandrel at the unload station to remove the pair of pants with the etched pattern at the unload station.

40. The method of claim 37 including positioning a pair of pants on a second expandable and retractable mandrel while said predetermined pattern is being etched into the pants supported by said first mandrel by said laser device, and positioning the second mandrel to the laser device following completion of etching of the pants supported by said first mandrel.

41. The method of claim 37 including positioning the pants on said first mandrel at a loading station, etching the predetermined pattern into said pants supported by said first mandrel at a laser station, positioning a pair of pants on a second expandable and contractable mandrel at said loading station while said first mandrel is at said laser station.

42. The method of claim 41 including removing a pair of pants from a third expandable and contractible mandrel at an unloading station by retracting said mandrel at said unloading station while a pattern is being etched into the pants by a mandrel at said laser station and a pair of pants is being loaded onto a mandrel at said loading station.

43. The method of claim 37 including supporting the pair of pants on the mandrel with a front side facing the laser device such that said predetermined pattern is etched into a front side of said pants at a predetermined location.

44. The method of claim 43 including rotating said mandrel to position a rear side of said pants to said laser device such that upon actuation of said laser device a predetermined pattern is etched in a rear side of said pants at a predetermined location.

45. The method of claim 37 including locating the outer sides of the legs of a pair of pants supported on the mandrel at a predetermined angle with respect to a waist portion of the pants upon expansion of said mandrel.

46. A method of forming a pattern into cloth pants comprising the steps of:

providing a plurality of expandable and retractable mandrels, moving said mandrels successively to a plurality of stations including a loading station, a laser station, and an unloading station, positioning a pair of pants onto a mandrel at said loading station, expanding the mandrel at the loading station to tautly support the pants on the mandrel, advancing the mandrel with the pants supported thereon to the laser station, etching a predetermined pattern into said pants at a predetermined location by generation of a laser beam at said laser station advancing the mandrel with a pair of pants supported from the laser station to the unload station, and retracting the mandrel at the unload station to remove the pants from the mandrel.

* * * * *